(12) United States Patent
Govil

(10) Patent No.: US 9,986,179 B2
(45) Date of Patent: May 29, 2018

(54) SENSOR ARCHITECTURE USING FRAME-BASED AND EVENT-BASED HYBRID SCHEME

(71) Applicant: QUALCOMM Incorporated, San Diego, CA (US)

(72) Inventor: Alok Govil, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/864,700

(22) Filed: Sep. 24, 2015

(65) Prior Publication Data

US 2016/0094796 A1 Mar. 31, 2016

Related U.S. Application Data

(60) Provisional application No. 62/057,710, filed on Sep. 30, 2014.

(51) Int. Cl.
*H04N 5/345* (2011.01)
*H04N 5/372* (2011.01)
*H04N 5/378* (2011.01)
*H04N 5/3745* (2011.01)

(52) U.S. Cl.
CPC ........... *H04N 5/345* (2013.01); *H04N 5/3456* (2013.01); *H04N 5/378* (2013.01); *H04N 5/37206* (2013.01); *H04N 5/37452* (2013.01)

(58) Field of Classification Search
CPC .... H04N 5/345; H04N 5/37206; H04N 5/378; H04N 5/3456; H04N 5/37452
See application file for complete search history.

(56) References Cited

U.S. PATENT DOCUMENTS

| 5,543,590 | A | 8/1996 | Gillespie et al. |
| 6,011,257 | A | 1/2000 | Endoh |
| 7,038,185 | B1 | 5/2006 | Tumblin et al. |
| 7,151,844 | B2 | 12/2006 | Stevenson et al. |
| 8,462,996 | B2 | 6/2013 | Moon et al. |
| 8,902,971 | B2 | 12/2014 | Pace et al. |
| 8,928,793 | B2 | 1/2015 | McMahon |
| 2001/0028405 | A1 | 10/2001 | Kondo et al. |
| 2004/0155175 | A1 | 8/2004 | McNulty |

(Continued)

FOREIGN PATENT DOCUMENTS

| CN | 102663409 A | 9/2012 |
| DE | 102006023611 A1 | 11/2007 |

(Continued)

OTHER PUBLICATIONS

Chi, Y.M., et al., "CMOS Camera With In-Pixel Temporal Change Detection and ADC," IEEE Journal of Solid-State Circuits, vol. 42, No. 10, Oct. 2007, pp. 2187-2196.

(Continued)

*Primary Examiner* — Twyler Haskins
*Assistant Examiner* — Angel L Garces-Rivera
(74) *Attorney, Agent, or Firm* — Kilpatrick Townsend & Stockton, LLP

(57) ABSTRACT

A hybrid camera sensor offers efficient image sensing by periodically evaluating pixels at a certain frame rate and disregarding values of pixels that have changed less than a threshold amount. Because only a fraction of pixels in the camera sensor may change values from frame to frame, this can result in faster readout times, which can optionally enable increased frame rates.

28 Claims, 10 Drawing Sheets

(56) References Cited

U.S. PATENT DOCUMENTS

| | | |
|---|---|---|
| 2009/0020612 A1 | 1/2009 | Drzymala et al. |
| 2009/0157707 A1 | 6/2009 | Ito et al. |
| 2010/0182468 A1 | 7/2010 | Posch et al. |
| 2011/0128428 A1 | 6/2011 | Takatoku et al. |
| 2011/0298755 A1 | 12/2011 | Ni |
| 2012/0138774 A1 | 6/2012 | Kelly et al. |
| 2012/0313960 A1 | 12/2012 | Segawa et al. |
| 2013/0054505 A1 | 2/2013 | Ross et al. |
| 2013/0121590 A1 | 5/2013 | Yamanaka et al. |
| 2013/0176552 A1 | 7/2013 | Brown et al. |
| 2014/0125799 A1 | 5/2014 | Bos et al. |
| 2014/0149754 A1 | 5/2014 | Silva et al. |
| 2014/0169663 A1 | 6/2014 | Han et al. |
| 2014/0319325 A1 | 10/2014 | Kawahito et al. |
| 2014/0320666 A1 | 10/2014 | Badawy et al. |
| 2014/0363049 A1 | 12/2014 | Benosman et al. |
| 2014/0368423 A1 | 12/2014 | Brenckle et al. |
| 2014/0368626 A1 | 12/2014 | John et al. |
| 2014/0368712 A1 | 12/2014 | Park et al. |
| 2015/0036942 A1 | 2/2015 | Smirnov et al. |
| 2016/0091946 A1 | 3/2016 | Govil et al. |
| 2016/0094800 A1 | 3/2016 | Gousev |
| 2017/0064211 A1 | 3/2017 | Omid-Zohoor |

FOREIGN PATENT DOCUMENTS

| | | |
|---|---|---|
| DE | 102008052930 A1 | 4/2010 |
| EP | 2709066 A1 | 3/2014 |
| JP | 2008131407 A | 6/2008 |
| JP | 2013003787 A | 1/2013 |
| WO | WO-2012093381 A1 | 7/2012 |
| WO | WO-2014015194 A2 | 1/2014 |

OTHER PUBLICATIONS

Habibi, M., "A Low Power Smart CMOS Image Sensor for Surveillance Applications", IEEE 6th Iranian Machine Vision and Image Processing, Oct. 27, 201, 4 pages.

International Search Report and Written Opinion—PCT/US2015/052340—ISA/EPO—dated Dec. 16, 2015.

Delbruck, T., et al., "Activity-Driven, Event-Based Vision Sensors," Proceedings of 2010 IEEE International Symposium on Circuits and Systems (ISCAS), 2010, 4 pages.

Etienne-Cummings, R., et al., "A Programmable Focal-Plane MIMD Image Processor Chip", IEEE Journal of Solid-State Circuits, Jan. 2001, vol. 36, No. 1, pp. 64-73.

Hsiao, P.Y., et al., "A Novel CMOS Imager with 2-Dimensional Binarization and Edge Detection for Highly Integrated Imaging Systems," Digest of Technical Papers. International Conference on Consumer Electronics, 2006, pp. 71-72.

Lahdenoja, O., et al., "A Massively Parallel Algorithm for Local Binary Pattern based Face Recognition", IEEE, ISCAS 2006, pp. 3730-3733.

Laiho, M., et al., "Dedicated Hardware for Parallel Extraction of Local Binary Pattern Feature Vectors", 2005 9th International Workshop on Cellular Neural Networks and Their Applications, IEEE, May 2005, pp. 27-30.

Pierzchala, E., et al., "High Speed Field Programmable Analog Array Architecture Design", Analogix Corporation, Feb. 1994, 61 pages.

Poikonen, J., et al., "MIPA4k: A 64×64 Cell Mixed-mode Image Processor Array", ISCAS 2009, IEEE, May 24, 2009, pp. 1927-1930.

Posch, C., et al., "An Asynchronous Time-Based Image Sensor," IEEE International Symposium on Circuits and Systems (ISCAS), 2008, 4 pages.

Qualcomm, "FAST Corners", Sep. 15, 2015, 6 Slides.

Shi, Y., et al., "Smart Cameras: Fundamentals and Classification," Chapter 2, A.N. Belbachir (Ed.), Springer Science+Business Media, LLC 2010, pp. 19-34.

Stack Overflow, "FAST Detector in every levels on Gaussian Pyramids", matlab, Retrieved from internet, URL:http://stackoverflow.com/questions/24222611/fast-detector-in-every-levels-on-gaussian-pyramids , on Sep. 11, 2015, 2 Pages.

Wikipedia, "Features from accelerated segment test", Retrieved from Internet, URL: https://en.wikipedia.org/wiki/Features_from_accelerated_segment_test#High-speed_test , on Sep. 11, 2015, 6 Pages.

Wyatt, J.L., et al., "The MIT Vision Chip Project: Analog VLSI Systems for Fast Image Acquisition and Early Vision Processing," IEEE International Conference on Robotics and Automation, 1991, vol. 2, pp. 1330-1335.

Yu, H, "FAST Corner detection—Machine Learning for high speed corner detection", Nov. 16, 2010, 60 Slides.

Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), p. 723-736, XP011479510, ISSN: 2156-3357, DOI: 10.1109/JETCAS.2012.2223552.

Trein, J. et al., "Development of a FPGA Based Real-Time Blob Analysis Circuit", ISSC 2007, Derry, Sep. 13-14 (6 pages).

SENSOR ARCHITECTURE USING FRAME-BASED AND EVENT-BASED HYBRID SCHEME

CROSS-REFERENCE TO RELATED APPLICATIONS

This application claims the benefit of U.S. Provisional Patent Application Ser. No. 62/057,710, entitled "CAMERA SENSOR ARCHITECTURE USING FRAME-BASED AND DVS HYBRID SCHEME," filed on Sep. 30, 2014, which is assigned to the assignee hereof and incorporated herein by reference for all purposes.

BACKGROUND

Sensors, such as camera sensors utilized in electronic devices such as mobile phones, tablets, personal media players, and the like comprise arrays of sensor elements, or pixels, arranged in two dimensions in order to obtain a two-dimensional image of a scene. In traditional video capture, multiple images, or "frames" of video, are captured sequentially at a fixed resolution. In such instances, the camera sensor is sampled at a fixed frame rate (e.g., 30 frames per second). This time-based sampling leads to redundancy in captured information because, most typically, relatively few pixel values change from one frame to the next. This leads to power inefficiency, which can be especially burdensome for battery-powered devices.

Event-based cameras, such as a dynamic vision sensor (DVS), have been devised to address some of this inefficiency by communicating events only for those pixels with values (e.g., voltage levels) that have changed beyond a threshold amount. While event-based cameras have been intended to solve the power issue with frame-based camera sensors, these still can consume power if events occur quickly and can sometimes capture events at a speed greater than is useful for certain applications.

SUMMARY

Techniques provided herein are directed toward a hybrid sensor that offers efficient image sensing by periodically evaluating pixels at a certain frame rate and disregarding values of pixels that have changed less than a threshold amount. Because only a fraction of pixels in the camera sensor may change values from frame to frame, this can result in faster readout times, which can optionally enable increased frame rates.

An example apparatus for providing image sensing, according to the description, comprises a pixel array having a plurality of pixels arranged in two dimensions. Input sensed by each pixel of the plurality of pixels results in a value associated with each pixel, each pixel of the plurality of pixels is configured to be periodically evaluated at a frame rate, and each pixel of the plurality of pixels comprises at least one output that is indicative of whether the value associated with each pixel has changed beyond a threshold level since a previous evaluation of the pixel.

The apparatus can include one or more of the following features. The at least one output may comprise a digital output. The at least one output may comprise an analog output that provides an output signal only when the value associated with each pixel has changed beyond a the threshold level since the previous evaluation of the pixel. The apparatus may comprise, for at least one pixel of the plurality of pixels, an analog-to-digital converter (ADC) coupled with the analog output of the least one pixel and configured to be in a low-power mode when it is determined, from a digital output signal of the pixel, that the value associated with the pixel has not changed beyond the threshold level since the previous evaluation of the pixel. The apparatus may comprise an analog-to-digital converter (ADC) coupled with the analog output of at least one pixel of the plurality of pixels, and additional circuitry coupled with an output of the ADC, where the additional circuitry is configured to ignore an output signal of the ADC when it is determined, from a digital output signal of the at least one pixel, that the value associated with the at least one pixel has not changed beyond the threshold level since the previous evaluation of the at least one pixel. The apparatus may comprise a processing unit configured to adjust an integration time. The processing unit may be further configured to modify a pixel exposure value associated with a pixel of the plurality of pixels based on the integration time. The apparatus may comprise a processing unit configured to adjust the frame rate.

An example method for providing image sensing, according to the description, may comprise for each pixel in a plurality of pixels in a pixel array, sensing a value associated with the pixel, periodically evaluating each pixel in the plurality of pixels at a frame rate, and providing, for each pixel of the plurality of pixels, at least one output that is indicative of whether the value associated with each pixel has changed beyond a threshold level since a previous evaluation of the pixel.

An example method may include one or more of the following features. The at least one output may comprise a digital output. The at least one output may comprise an analog output that provides an output signal only when the value associated with each pixel has changed beyond the threshold level since the previous evaluation of the pixel. The method may comprise operating an analog-to-digital converter (ADC) coupled with the analog output of the least one pixel of the plurality of pixels in a low-power mode when it is determined, from a digital output signal of the pixel, that the value associated with the pixel has not changed beyond the threshold level since the previous evaluation of the pixel. The method may comprise ignoring an output signal of an analog-to-digital converter (ADC) coupled with the analog output of at least one pixel of the plurality of pixels when it is determined, from a digital output signal of the at least one pixel, that the value associated with the at least one pixel has not changed beyond the threshold level since the previous evaluation of the at least one pixel. The method may comprise adjusting an integration time of at least one pixel of the plurality of pixels and/or modifying a pixel exposure value associated with the at least one pixel based on the integration time. The method may further comprise adjusting the frame rate.

Another example apparatus, according to the description, may comprise means for sensing, for each pixel in a plurality of pixels in a pixel array, a value associated with the pixel, means for periodically evaluating each pixel in the plurality of pixels at a frame rate, and means for providing, for each pixel of the plurality of pixels, at least one output that is indicative of whether the value associated with each pixel has changed beyond a threshold level since a previous evaluation of the pixel.

The example apparatus may include one or more of the following features. The means for providing at least one output may comprise means for providing a digital output. The means for providing at least one output may comprise means for providing an analog output signal only when the value associated with each pixel has changed beyond the threshold level since the previous evaluation of the pixel. The apparatus may comprise means for causing an analog-to-digital converter (ADC) coupled with the analog output of the least one pixel of the plurality of pixels to operate in a low-power mode when it is determined, from a digital output signal of the pixel, that the value associated with the pixel has not changed beyond the threshold level since the previous evaluation of the pixel. The apparatus may comprise means for ignoring an output signal of an analog-to-digital converter (ADC) coupled with the means for providing an analog output signal of at least one pixel of the plurality of pixels when it is determined, from a digital output signal of the at least one pixel, that the value associated with the at least one pixel has not changed beyond the threshold level since the previous evaluation of the at least one pixel. The apparatus may comprise means for adjusting an integration time of at least one pixel of the plurality of pixels and/or means for modifying a pixel exposure value associated with the at least one pixel based on the integration time. The apparatus may comprise means for adjusting the frame rate.

An example non-transitory computer-readable medium, according to the disclosure, may have instructions embedded thereon for processing an image. The instructions, when executed by one or more processing units, cause the one or more processing units to periodically evaluate each pixel in a plurality of pixels at a frame rate where input sensed by each pixel of the plurality of pixels results in a value associated with each pixel, and receive, for each pixel of the plurality of pixels, at least one output that is indicative of whether the value associated with each pixel has changed beyond a threshold level since a previous evaluation of the pixel.

The non-transitory computer-readable medium can include one or more of the following features. The instructions for causing the one or more processing units to receive the at least one output may include instructions for receiving a digital output. The instructions for causing the one or more processing units to receive the at least one output can include instructions for receiving analog output that provides an output signal only when the value associated with each pixel has changed beyond the threshold level since the previous evaluation of the pixel. The non-transitory computer-readable medium may further comprise instructions for causing the one or more processing units to operate an analog-to-digital converter (ADC) coupled with the analog output of the least one pixel of the plurality of pixels in a low-power mode when it is determined, from a digital output signal of the pixel, that the value associated with the pixel has not changed beyond the threshold level since the previous evaluation of the pixel. The non-transitory computer-readable medium may further comprise instructions for causing the one or more processing units to ignore an output signal of an analog-to-digital converter (ADC) coupled with the analog output of at least one pixel of the plurality of pixels when it is determined, from a digital output signal of the at least one pixel, that the value associated with the at least one pixel has not changed beyond the threshold level since the previous evaluation of the at least one pixel. The non-transitory computer-readable medium may further comprise instructions for causing the one or more processing units to adjust an integration time of at least one pixel of the plurality of pixels and/or instructions for causing the one or more processing units to modify a pixel exposure value associated with the at least one pixel based on the integration time. The non-transitory computer-readable medium may further comprise instructions for causing the one or more processing units to adjust the frame rate.

BRIEF DESCRIPTION OF THE DRAWINGS

An understanding of the nature and advantages of various embodiments may be realized by reference to the following figures.

DETAILED DESCRIPTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

In traditional video capture by an electronic device, video frames are captured by a camera sensor of the electronic device sequentially at a fixed resolution and at a fixed frame rate. This time-based sampling leads to redundancy in captured information because, most typically, relatively few pixel values change from one frame to the next. These inefficiencies can be particularly unwanted in mobile devices and/or other battery-powered applications where extended battery life is desirable.

As used herein, the term "mobile device" can include any of a variety of portable electronic devices, such as mobile phones, tablets, portable media players, wearable devices, and the like. And although embodiments provided herein are described in terms of mobile devices, embodiments are not so limited. For example, embodiments may utilize stationary battery-powered devices, devices that are not battery powered, and more. A person of ordinary skill in the art will recognize that techniques and features described herein may be utilized in many different applications.

It should be noted that the embodiments herein describe intensity values sensed by and/or associated with pixels as being indicated with voltage values. However, it will be appreciated that other analog or digital values (e.g., currents) may additionally or alternatively be utilized.

It is also noted that while the embodiments discussed below reference "camera sensors," embodiments are not so limited. A person of ordinary skill in the art will appreciate that embodiments may alternatively (or additionally) include other types of sensors, including any kind of sensor comprising an array of sensor elements, or even a sensor with a single sensor element.

Figure 1:
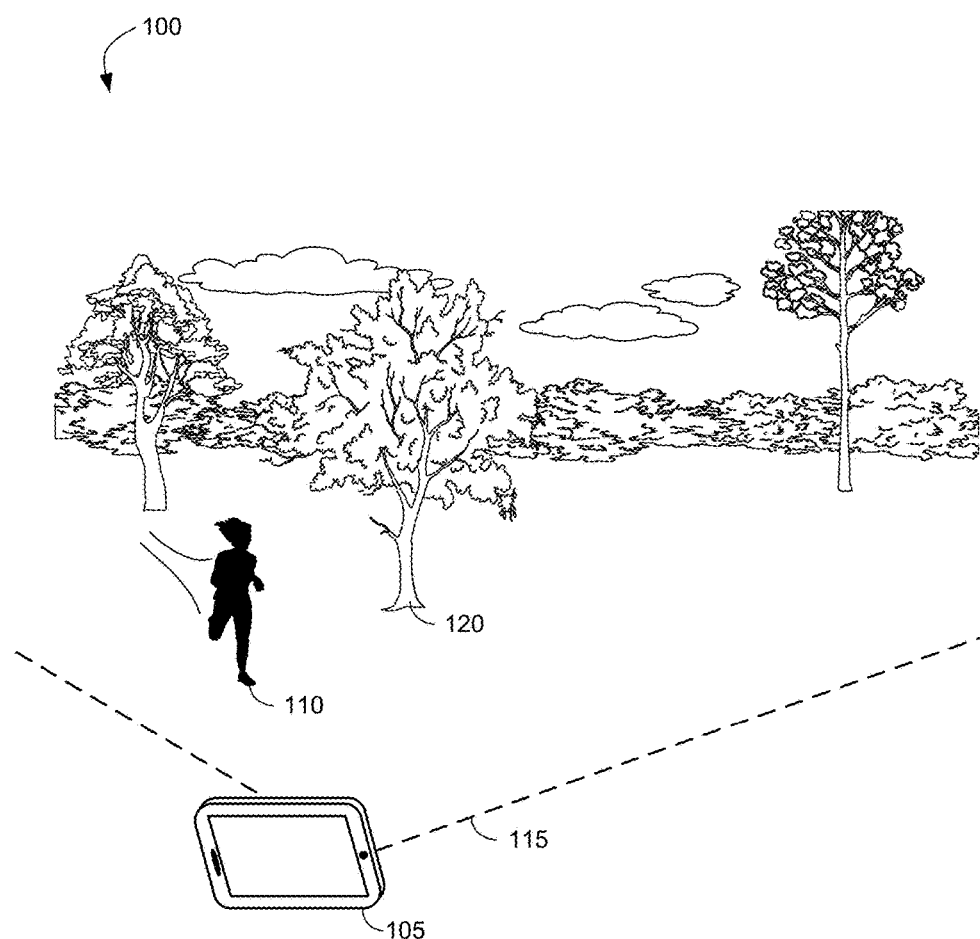
FIG. 1 is a simplified illustrating depicting an example scenario that highlights the inefficiencies of frame-based sampling.

FIG. 1 depicts a scenario that highlights the inefficiencies of frame-based sampling. Here, a mobile device 105 is capturing video of an outdoor scene 100 in which a runner 110 is (for the most part) the only object in that is moving within the field of view 115 of the mobile device's camera. Thus, in the video captured by the mobile device 105, relatively few pixels change from one frame to the next because the pixels in the captured frames that represent the runner comprise a relatively small portion of total amount of pixels of each frame. Pixels representing the tree 120, for example, undergo little or no variation from frame to frame (when the mobile device is relatively stationary itself). Because most of the pixels in the captured frames do not undergo change from one frame to the next, recapturing these unchanged pixels with every frame is unnecessary. This ultimately leads to consuming more power than is necessary for video capture.

Figure 2:
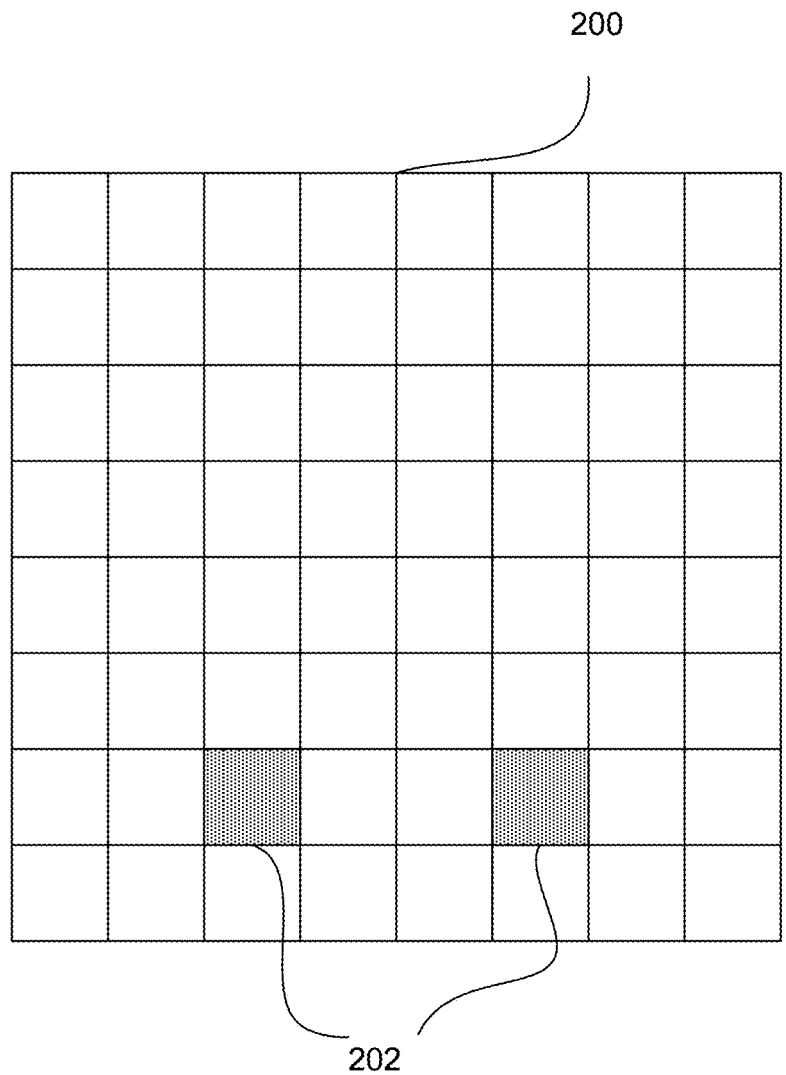
FIG. 2 is a simplified illustration of an example camera sensor comprising a plurality of sensor elements arranged in a two-dimensional array.
Figure 3:
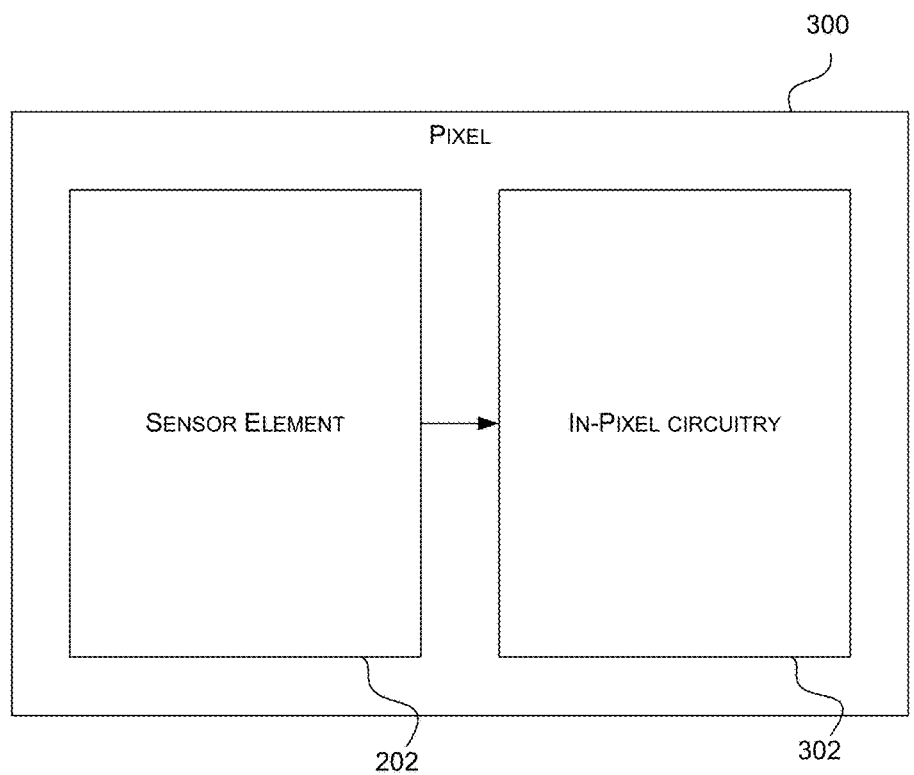
FIG. 3 is a simple block diagram of a pixel, comprising a sensor element coupled with in-pixel circuitry, according to one embodiment.
Figure 4:
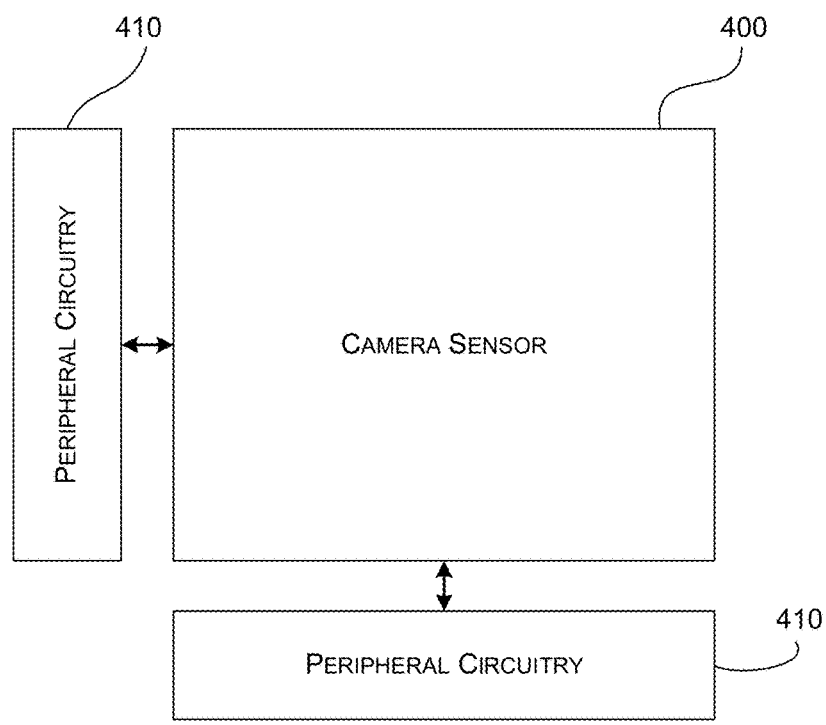
FIG. 4 is a simplified block diagram illustrating peripheral circuitry coupled to a camera sensor comprising a pixel array, according to an embodiment.

The mobile device 105 captures the frames with its camera by focusing light onto a camera sensor, which may include an image array comprising a plurality of sensor elements, capable of capturing the luminosity and/or color of the focused light. The sensor elements then can generate an output, such as a voltage, indicative of the captured light feature(s). Embodiments may include a two-dimensional image array configured to capture two-dimensional images, and the sensor elements can be aligned in columns and rows. FIGS. 2-4 provide some additional detail regarding camera sensors.

FIG. 2 is a simplified illustration of an example camera sensor 200 comprising a plurality of sensor elements arranged in a two-dimensional array. For simplicity, the camera sensor 200 illustrated here has only 64 (8×8) sensor elements. In various implementations, however, the shape of the sensor elements, the aspect ratio of the camera sensor 200, the number of sensor elements, and the spacing between the sensor elements may vary, depending on desired functionality. Sensor elements 202 represent example sensor elements from a grid of 64 pixels.

In certain implementations, the sensor elements may have in-pixel circuitry coupled to the sensor element. The sensor element and the in-pixel circuitry together may be referred to as a pixel. Because in-pixel circuitry can be located at or near each sensor element, pixels may be arranged in a manner similar to the sensor elements in FIG. 2. Thus, a plurality of pixels may be arranged in two dimensions to form a camera sensor 200. FIG. 3 is a simple block diagram of a pixel 300, comprising a sensor element 202 (corresponding to a sensor element 202 of FIG. 2) coupled with in-pixel circuitry 302, according to one embodiment. The processing performed by the in-pixel circuitry coupled to the sensor element may be referred to as in-pixel processing. Depending on desired functionality, the in-pixel circuitry may include analog and/or digital components. FIGS. 6A-6D include examples of in-pixel circuitry 302 for detecting change in pixel values.

Furthermore, in certain implementations, the sensor array may have peripheral circuitry coupled to a group of sensor elements or the entire sensor array. Such peripheral circuitry may be included within the same packaging and/or substrate (e.g., semiconductor substrate) as the camera sensor, and may be referred to as on-chip sensor circuitry.

FIG. 4 is a simplified block diagram illustrating peripheral circuitry 410 coupled to the camera sensor 400 comprising a pixel array. Peripheral circuitry 410 can include, for example, circuitry configured to read output value(s) of each pixel and send the value(s) to a processor or other circuitry for image processing. Peripheral circuitry 410 can also include circuits for detecting change in a pixel. In some embodiments, the pixel read out and/or image processing may be implemented in the peripheral circuitry using a dedicated sensor processor that receives digital and/or analog outputs from the camera sensor 400. While FIGS. 6A-6D are discussed in the context of an in-pixel implementation, it is understood that circuits similar to those disclosed in FIGS. 6A-6D can be implemented in peripheral circuitry 410 as shown in FIG. 4.

Figure 5:
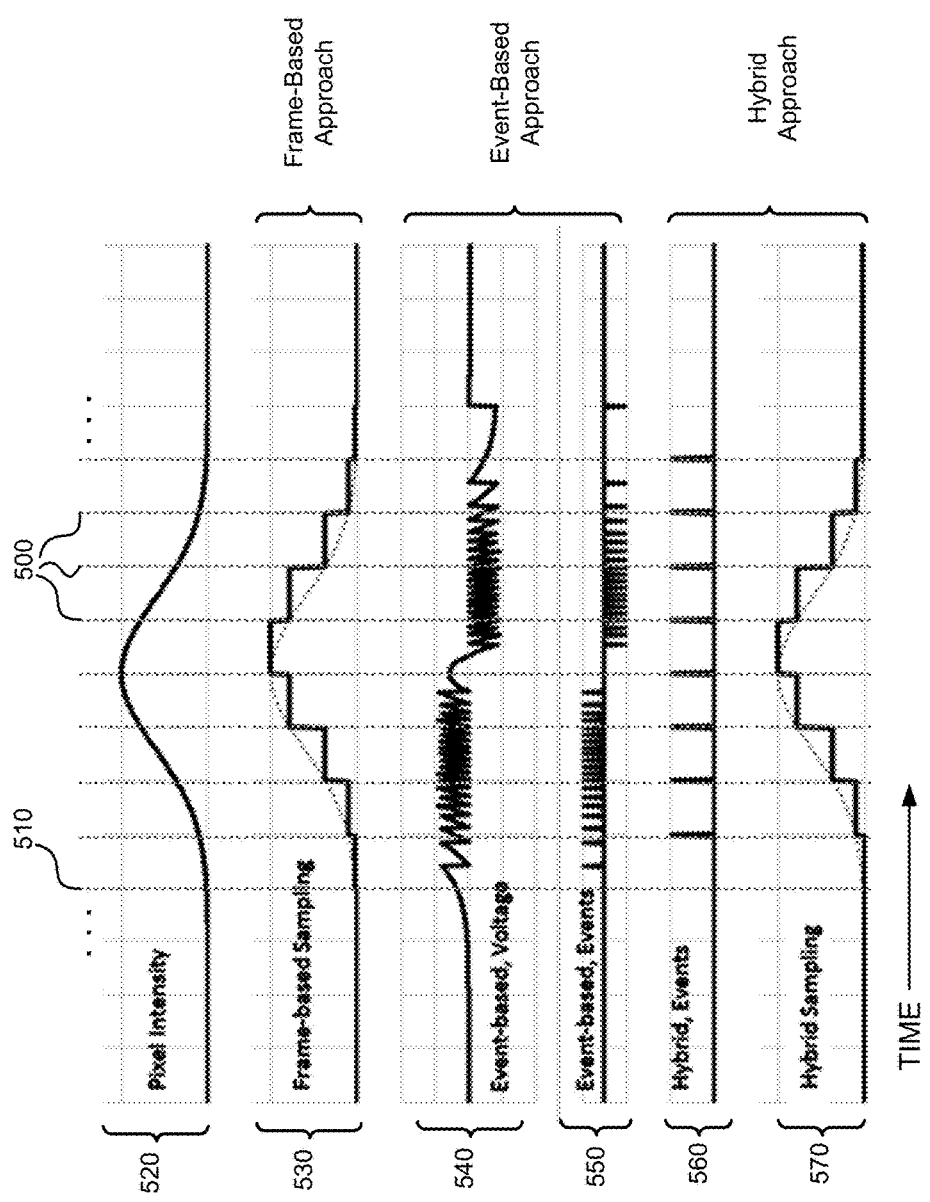
FIG. 5 is a series of graphs illustrating examples of different approaches for sampling pixel values in a sensor.

FIG. 5 is a series of graphs illustrating the different approaches for sampling pixel values in a sensor (such as sensors 200, (sensor element) 300, or 400 of FIG. 2, 3, or 4). These approaches include traditional frame-based and event-based sampling, as well as the hybrid approach proposed herein. The differences in sampling between the frame-based, event-based, and hybrid approaches can be implemented using different peripheral circuitry (e.g., peripheral circuitry 410 of FIG. 4) and/or in-pixel circuitry (e.g., in-pixel circuitry 302 of FIG. 3). Furthermore, sampled data may be processed differently to accommodate these differences in sampling approaches.

Graph 520 illustrates an example pixel intensity (e.g., voltage value) of a pixel over a period of time. The graphs below illustrate corresponding output values of different approaches, over the same period of time, based on the intensity of the top graph.

Graph 530, for instance, shows a sampled output of a frame-based approach. Grid lines are provided to highlight sample times 500, which are points in time in which the pixel is sampled. (For simplicity, not all sample times are labeled with numerical indicators.) As illustrated, the frame-based approach provides a sampled output that largely echoes the pixel intensity, with values of the sampled output being updated at each sample time 500. A higher frame rate could be utilized to help the sampled output match the pixel intensity more closely. However, because all pixels are sampled at the frame rate, bandwidth and power requirements would typically be greater than the bandwidth and power requirements of the hybrid approach illustrated further below.

Graphs 540 and 550 illustrate voltage and event indicators of an event-based approach (utilized in a DVS, for example). These graphs illustrate a firing rate coding approach in which, when voltage at a pixel (shown in graph 540) reaches a certain level, a corresponding event (shown in graph 550) is triggered and the voltage at the pixel is reset. Thus, a large increase or decrease in pixel intensity over a period of time is reflected by a large number of events during that period. The events further indicate a polarity of the change, showing whether the increase of intensity is positive or negative.

Because the event-based approach does not utilize a frame rate or sampling times, its outputs may occur at far faster rates than a frame rate of the frame-based approach. Because it relays only changes in pixels, the event-based approach is typically far more efficient than the frame-based approach. However, because outputs are not synchronized, event-based approaches require additional arbitration circuitry (which may be implemented in peripheral or other downstream circuitry) to organize the pixel value readout, and can still require a relatively large amount of bandwidth to relay all of the events for each changed pixel.

Alternative events-based approaches (not shown in FIG. 5) can include an Active Pixel Sensor (APS) that allows a sampled voltage value associated with the pixel to be output (rather than a firing rate coding output). This approach, however, can still output values at far faster than needed for some applications, thereby using more power to provide greater time resolution than useful in the given applications.

Finally, graphs 560 and 570 of FIG. 5 illustrate an embodiment of a hybrid approach as provided herein. In this approach, the pixel is sampled at sampling time in a manner similar to the frame-based approach. Here, however, the sampling is contingent on whether a change in the pixel's voltage value takes place. As shown, the hybrid approach has an event output that indicates, for each sampling time, whether a change in the pixel voltage value (beyond a threshold amount) has occurred. If so, the pixel's voltage value is sampled and output in a manner similar to the frame-based approach. However, if a change has not occurred in the pixel or change has occurred that is less than a threshold amount, and an event is not indicated by the event output, the pixel's voltage may not be sampled, or a sampled value may be ignored, depending on desired functionality.

Thus, according to the hybrid approach of graphs 560 and 570, the values of the pixels that have changed can be relayed to a processing unit or other circuitry for image processing, while information about pixels that have undergone no change, or change less than the threshold amount, is not sent to the processing unit. Because outputs for the pixels in a pixel array under the hybrid approach are synchronized on the frame rate, the readout can be ordered in a manner similar to the frame-based approach, without the need for separate arbitration (and the associated circuitry required for such arbitration). This can provide power savings over both the frame-based and event-based approaches.

It can be noted that, in this example, the hybrid sampling output is virtually identical to the frame-based sampling since the illustrated pixel value is in fact changing. Therefore, in situations where a pixel value is not changing significantly, hybrid sampling will differ more significantly from a frame-based sampling than illustrated. However, differences between hybrid and frame-based sampling may occur even when pixel values are changing, for example, where a change in the pixel intensity undergoes a change less than a threshold amount for the hybrid approach. For example, at a first point time (labeled 510), the pixel intensity has increased only very slightly from its original value. The frame-based sampling reflects this increase. In the hybrid approach, because the pixel intensity changes less than a threshold amount, no event is triggered. Thus, the hybrid approach does not reflect the intensity change. (Other embodiments of a hybrid approach, for example where a threshold amount is lower, may have an output that would reflect this initial increase in pixel intensity at the first point in time 510.)

Figure 6A:
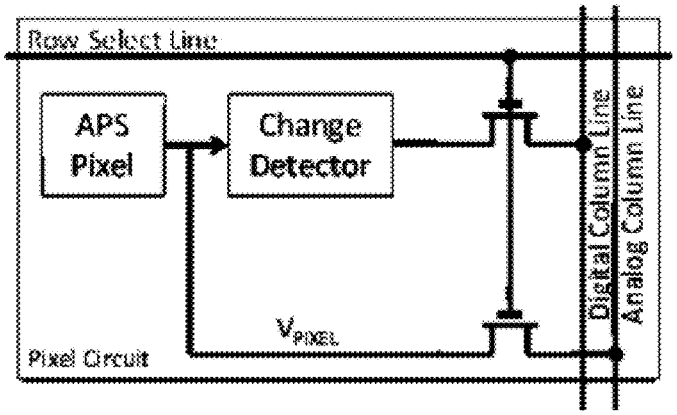
FIGS. 6A-6C are circuit block diagrams of pixel circuitry that can be utilized in the hybrid approach, according to some embodiments.
Figure 6B:
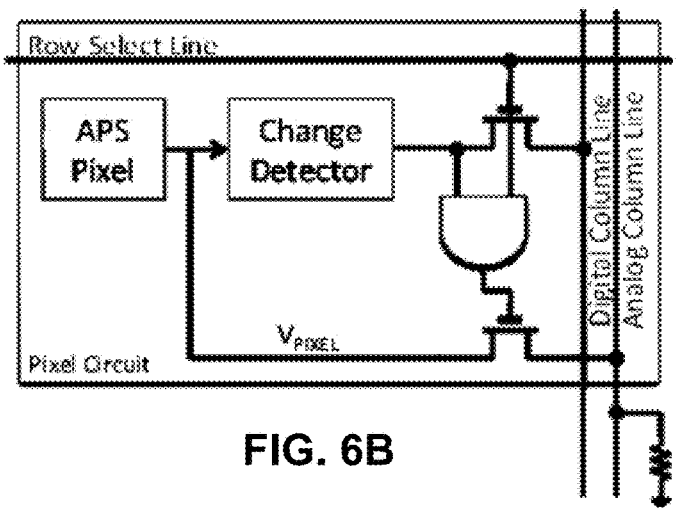
Figure 6C:
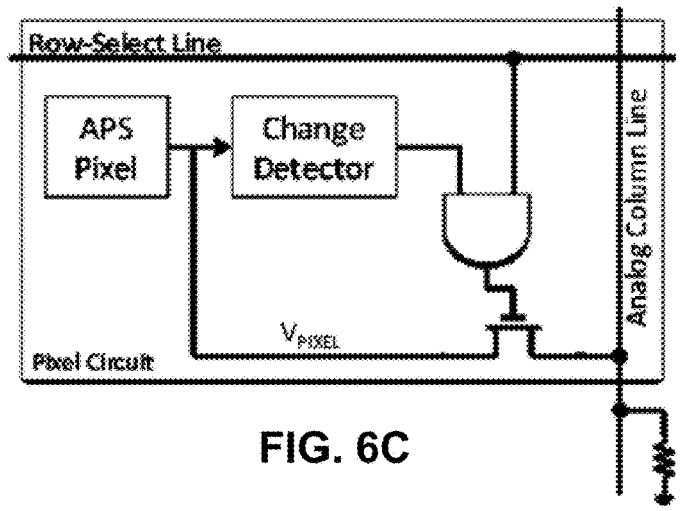

FIGS. 6A-6C are circuit block diagrams of pixel circuitry that can be utilized in the hybrid approach, according to some embodiments. Here, the active pixel sensor (APS Pixel) may correspond to the sensor element of FIG. 3, while the remaining circuitry may correspond to the in-pixel circuitry 302 of FIG. 3, collectively forming a pixel (300 of FIG. 3). As indicated previously, a plurality of pixels may be arranged in two dimensions to form a camera sensor (e.g., sensor 200 of FIG. 2). Pixel values may be read by circuitry (e.g., peripheral circuitry 410 of FIG. 4) utilizing the row select line in conjunction with the digital and/or analog column line. While FIGS. 6A-6C illustrate embodiments implementing in-pixel circuitry, it is understood that one or more components of FIGS. 6A-6C can be implemented in peripheral circuitry (e.g., peripheral circuitry 410 of FIG. 4).

Input sensed by each pixel (for example, light captured from a scene passing through optics to create an image in the plane of the pixel array) results in a value indicative of the amount of light sensed at the given pixel location, the value being associated with the pixel. (FIG. 6D, described in more detail below, provides example APS pixel circuitry.) As previously indicated, readout in the hybrid approach can be similar to that in traditional frame-based approaches in the sense that each pixel may be sampled periodically at a given frame rate. Thus, a row select line can be used to retrieve information from (hereinafter "evaluate") each row of pixels in a pixel array periodically, according to the frame rate.

The approaches illustrated in FIGS. 6A-6C utilize an APS pixel to enable the output of an analog value (e.g., a voltage) indicative of the pixel intensity, and a change detector that outputs a digital signal (e.g., a high value) indicating that a value of the voltage of the APS pixel has changed beyond a threshold amount. In some implementations, the change detector circuit could include sample and hold circuit to store the previous value, and a comparator to compare a previous value to a current value. Other embodiments may detect change using other circuitry and/or means. A person of ordinary skill in the art will recognize that other embodiments may add, omit, alter, and/or rearrange illustrated components.

In FIG. 6A, each pixel has a digital output and an analog output. The digital output indicates whether a change has occurred at the pixel, and the analog output provides a sampled voltage value of the pixel. In this embodiment, both outputs are activated when the row-select line is activated, sending a digital signal (indicating whether a change has occurred) on the digital column line and an analog signal (indicating a sampled voltage of the pixel) on the analog column line to peripheral circuitry for processing of these signals. In this case, peripheral or other circuitry (such as a processing unit, not shown) could then determine to ignore the analog signal if the digital signal does not indicate that a change has occurred.

In FIG. 6B, similar to FIG. 6A, each pixel has a digital output and an analog output. When the row-select line is activated, the digital signal (indicating whether a change has occurred) is sent on the digital column line. Here, however, the sampled voltage of the APS pixel is not sent on the analog column line unless the output of the digital signal indicates a change in the voltage of the pixel (beyond a threshold amount) has occurred since the previous evaluation of the pixel. In some embodiments, peripheral and/or other circuitry (such as a processing unit) can then use the digital output to determine whether a pixel has changed and update pixels of a stored image where change has occurred. For pixels where the digital output does not indicate a change has occurred, the corresponding pixels in the stored image would not be altered.

In FIG. 6C, similar to FIG. 6B, the sampled voltage of the APS pixel is not sent on the analog column line unless the output of the digital signal indicates a change in the voltage of the pixel (beyond a threshold amount) has occurred since the previous evaluation of the pixel. In contrast to FIG. 6B, however, the circuitry of FIG. 6C does not include a separate digital output. In this case, peripheral or other circuitry (such as a processing unit, not shown) could then process the analog signal when the analog signal is provided, and do nothing when the analog signal is not provided. Not providing an analog signal in cases where there is no, or below threshold, change in the pixel as shown in FIGS. 6B and 6C can save power compared to the implementation of FIG. 6A, as described further below with reference to FIG. 6D.

Figure 6D:
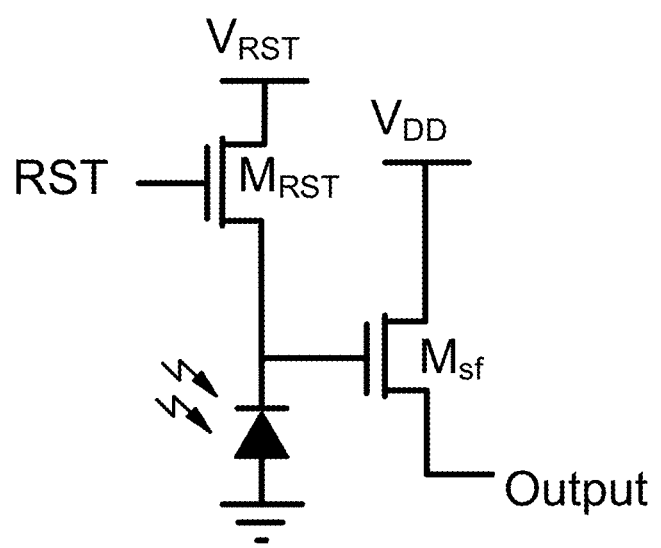
FIG. 6D is a schematic diagram of an example Active Pixel Sensor (APS) circuit that can correlate to the "APS Pixel" block shown in FIGS. 6A-6C, according to one embodiment.

FIG. 6D is a schematic diagram of an example APS circuit that can correlate to the "APS Pixel" block shown in FIGS. 6A-6C, according to one embodiment. In this embodiment, RST is a reset signal related to the integration time of the pixel. The time span between the time at which the pixel is reset and the time when it is read is the integration time. More precisely, the time between when the reset pulse ends, and read pulse ends would be the integration time.

When the photodiode of FIG. 6D receives light, it generates a current. The current from the photodiode modulates the gate of the $M_{sf}$ circuit. Output of the APS circuit is the drain of the $M_{sf}$ transistor, which is split out to Change Detector circuit and the analog output connected to the column line, as shown in FIGS. 6A-6C.

In FIGS. 6B and 6C, if the Change Detector circuit shows no change, or below threshold change, (e.g., a low output) for the analog output of the APS, the transistor connecting the output of the APS to the analog column line shown in FIGS. 6B and 6C is turned off. Thus, current is not pulled from $V_{DD}$ in FIG. 6D to support the readout of the value from the pixel, which can accumulate into not insignificant power savings (e.g., for a 128 by 128 array at 60 Hz frame rate).

Note that FIGS. 6B and 6C has a resistor at the output. When output is disabled, "reading" the pixel will show ZERO volts (substantially no voltage) due to this resistor. This ZERO volts reading can be, in some implementations, indicative of no change in the value associated with the given pixel (that is, the value associated with the given pixel has not changed enough relative to the threshold since a previous evaluation of the pixel).

The Charge Detector may be implemented in a variety of ways that a person of ordinary skill in the art would recognize. Moreover, the Charge Detector may set a threshold charge at which the output of the Charge Detector changes from low to high. This threshold determines the threshold amount of change a pixel undergoes before a digital output indicates a change has occurred and may be set based on desired functionality, implemented circuitry, manufacturing concerns, and/or other factors.

The power savings in this hybrid approach provided by the circuitry in FIGS. 6A-6D (and other circuitry) can be significant. Because only a fraction of the pixels in a pixel array are likely to change beyond a threshold amount within a frame rate period (as illustrated in FIG. 1), only a fraction of the information conveyed to a processing unit in a frame-rate approach would be conveyed in a hybrid approach. Also, in contrast to event-based approaches, which can include comparator and/or other circuitry for each pixel that is constantly on to determine changes in pixel values a hybrid approach can save a large amount of power because the circuitry for most rows in a pixel array will be inactive at any point in time, activating only when the row-select line is activated.

More broadly, embodiments of circuitry utilizing the hybrid techniques provided herein may employ one of several different power-saving techniques. In some embodiments, as indicated above, pixel circuitry may disable the analog output signal (e.g., refrain from sending out the analog output signal) when the value of the pixel has not changed beyond the threshold level since the previous evaluation of the pixel. The analog output of each pixel may be coupled with an analog-to-digital converter (ADC). Thus, in other embodiments, the ADC will not be used (and thereby may be disabled, kept in a low power mode, etc.) when the digital output indicates that the pixel value has not changed beyond the threshold level since the previous evaluation of the pixel, which can result in power savings. In other words, an ADC coupled with the analog output of at least one pixel can operate in a low-power mode when it is determined, from the digital output signal of the pixel, that the value associated with the pixel has not changed beyond the threshold level since the previous evaluation of the pixel. Means for causing the ADC to operate in a low-power mode can include circuitry and/or processing unit(s) configured to receive the digital output and cause (e.g., via a separate signal) the ADC to enter into a low-power (e.g., standby) mode. In some embodiments, the circuitry and/or processing unit(s) may be internal and/or external to the peripheral circuitry 410 and/or comprise processing unit(s) 910 as described below with regard to FIG. 9. In some embodiments, the ADC may incorporate this functionality such that it may receive the digital signal directly (e.g., without circuitry and/or processing unit(s) external to the ADC) and put itself into a low-power mode. An output of the ADC is typically sent to additional circuitry (e.g., a processor) for processing. Thus, in yet other embodiments, the additional circuitry can be configured to simply ignore an output signal of the ADC the digital output indicates that the value of the pixel has not changed beyond the threshold level since the previous evaluation of the pixel. In other words, means for ignoring an output signal of an ADC coupled with the analog output of at least one pixel (when it is determined, from a digital output signal of the at least one pixel, that the value associated with the at least one pixel has not changed beyond the threshold level since the previous evaluation) can include additional circuitry such as a processing unit (e.g., the processing unit(s) 910 of FIG. 9 described below). Embodiments may include the ADC in peripheral or similar circuitry.

Figure 7:
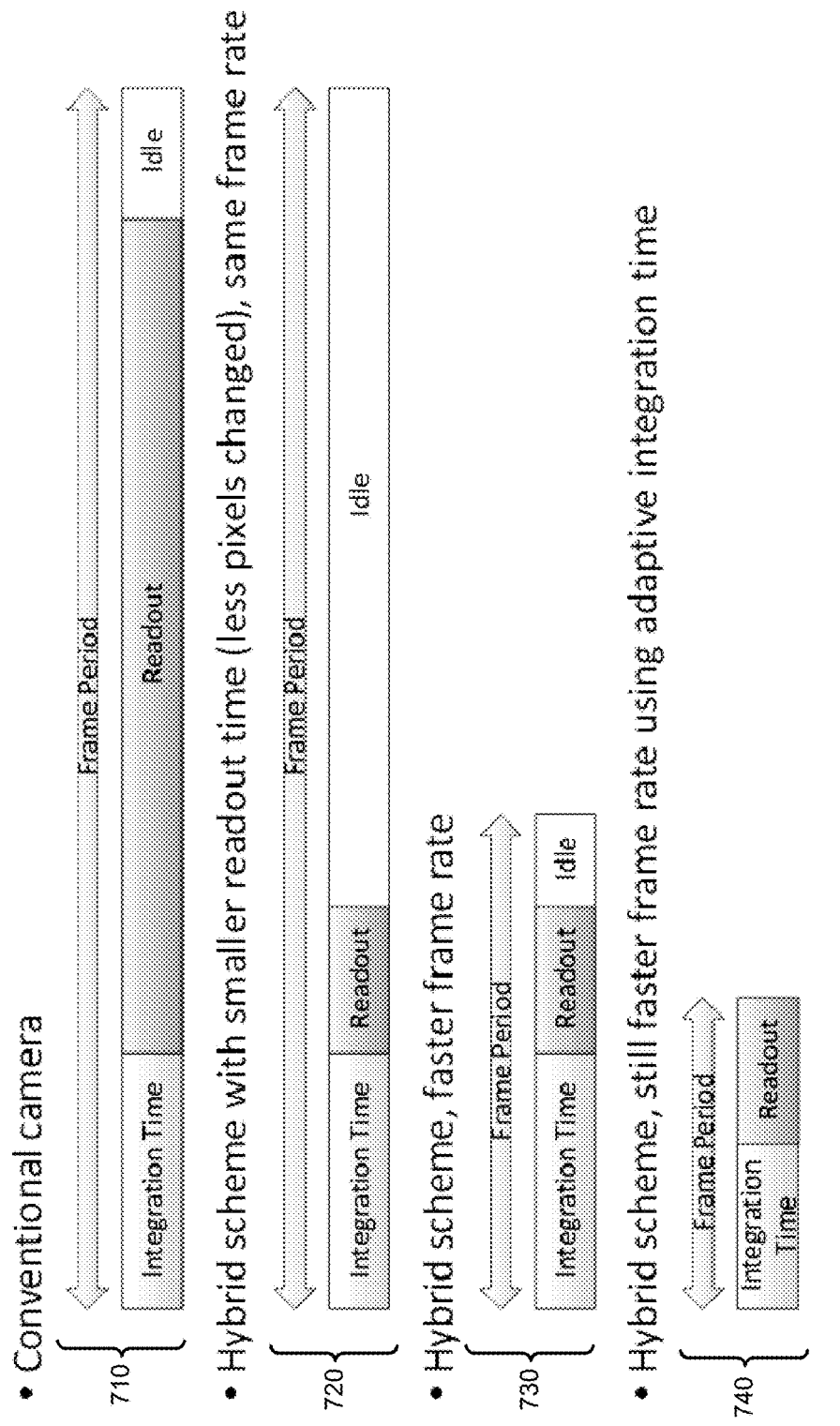
FIG. 7 is an illustration with several graphs showing functions occurring in a pixel array during a frame period, according to different embodiments.

Due to the reduced amount of overhead the hybrid techniques disclosed herein provide over traditional frame-based approaches, embodiments may further provide for additional functionality that utilizes some or all of the resulting additional bandwidth. FIG. 7 provides an illustration.

FIG. 7 includes several graphs (710-740) illustrating the functions occurring in a pixel array during a frame period. These include an integration time and readout. The integration time is the time a pixel is exposed to an input, for example visual input similar to an exposure time in film cameras. The analog value (e.g., voltage) associated with each pixel can then be digitized and transmitted as a pixel exposure value within a given range (e.g., 0-255). The readout is the time in which pixel values are sampled and sent to a processing unit for further processing.

As indicated in graph 710, the integration time and readout in a conventional (frame-based) camera may take up a large majority of the frame period, whereas the hybrid scheme, utilizing the hybrid techniques provided herein, may take far less time for a readout, because only a fraction of the pixels need to be sampled and sent. Thus, for the same frame period, the hybrid scheme may have a far larger amount of idle time when compared with a conventional camera, as shown in graph 720.

Thus, some embodiments may utilize an adaptive frame rate in which the frame rate may be increased to exploit the faster readout time. In certain scenarios, for example when something fast shoots across a small portion of the field of view of a camera, it may be advantageous to increase the frame rate. Embodiments can include a processing unit that adjusts the frame rate to reduce the amount of idle time, as shown in graph 730. This adjustment may be based on a determined amount of idle time. For example, if the processing unit determines that a pixel array is idle for 50% of the last several frames (or for a certain period of time), the frame period may be reduced up to 50%. Conversely, some embodiments may employ an adaptive frame rate in which a processing unit increases the frame period during times in which little or no movement occurs within the camera's field of view (e.g., less than a threshold amount of pixels indicate change). Thus, the adaptive frame rate can be implemented by a processor adapting the frame rate based on multiple factors including a history of the percentage of pixels changed, desired frame rate (e.g., to capture fast movements), or a desired power usage (e.g., where certain frame rate is shown to save power), or any combination thereof. Means for adjusting the frame rate can include peripheral circuitry 410 and/or a processing unit, such as the processing unit(s) 910 described below with regard to FIG. 9.

Additionally or alternatively, embodiments may further utilize an adaptive integration time that allows for the reduction of the integration time, as shown in graph 740. Means for adjusting the integration time of at least one pixel of the plurality of pixels can include peripheral circuitry 410 and/or a processing unit, such as the processing unit(s) 910 described below with regard to FIG. 9. Because the reduced integration time can result in reduced output values, a processing unit can modify the output values to compensate. For example, in a system where the pixel exposure value typically ranges from 0-255, but integration time has been reduced by 50% (resulting in values from 0-128), the processing unit may modify the pixel exposure values, increasing them by 2×. Put more generally, means for modifying a pixel exposure value associated with at least one pixel based on the integration time can include a processing unit, such as the processing unit(s) 910 described below with regard to FIG. 9. Additionally or alternatively, such means may be provided in the peripheral circuitry 410. Thus, the hybrid scheme can modify the integration time to provide further decreases in frame period, if desired. Some embodiments may further adapt the integration time to maintain a relatively short integration time, where possible, to increase power savings by increasing the amount of time in which the camera can be in a low power (idle) state.

Figure 8:
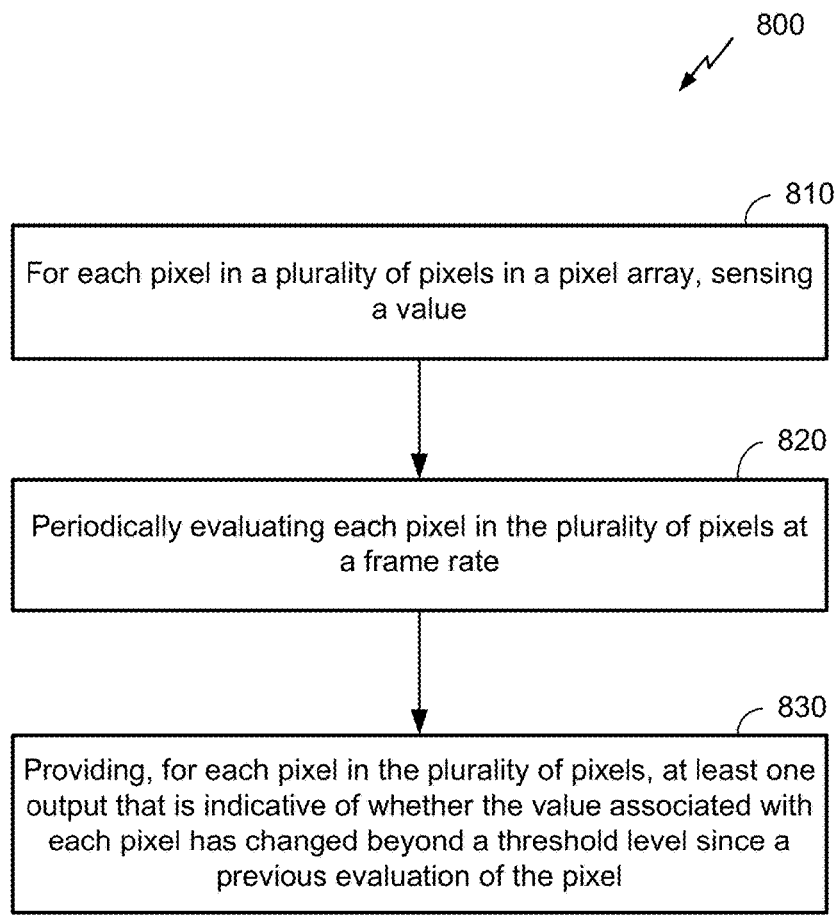
FIG. 8 is a flow diagram of a method of image sensing, according to an embodiment.

FIG. 8 is a flow diagram 800 of a method of image sensing, according to an embodiment. As with other figures provided herein, FIG. 8 is provided as a non-limiting example. Alternative embodiments may include additional functionality to that shown in the figure, and/or the functionality shown in one or more of the blocks in the figure may be omitted, combined, separated, and/or performed simultaneously. Means for performing the functionality of the blocks may include hardware as described above in relation to FIGS. 2-4 and 6A-6D, and/or other hardware and/or software of a device, such as the mobile device shown in FIG. 9 and described below. A person of ordinary skill in the art will recognize many variations.

At block 810, a value is sensed for each pixel in a plurality of pixels in a pixel array. Here, the pixel array may be a camera sensor (e.g., sensor 200 of FIG. 2). Means for performing the functionality of block 810 can include, for example, a sensor element (e.g., APS Pixel of FIGS. 6A-6C, the circuitry of 6D, and the like).

At block 820, each pixel in the plurality of pixels is periodically evaluated at a frame rate. As indicated in FIGS. 6A-6C, such periodic evaluation may include turning a Row Select Line on and reading a digital and/or analog column line. Means for performing the functionality of block 820 can include, for example, in-pixel circuitry, peripheral circuitry, Row Select Line, Digital Column Line, and Analog Column Line, as illustrated in FIGS. 3, 4, and 6A-6D. In some embodiments, the evaluation may further include a processing unit (e.g., processing unit 910 of FIG. 9, described below).

At block 830, for each pixel in the plurality of pixels, at least one output is provided that is indicative of whether the value associated with each pixel has changed beyond a threshold level since a previous evaluation of the pixel. This output may be provided, for example, by change detector circuitry (e.g., the Change Detector of FIGS. 6A-6C) in each pixel, and may be conveyed to peripheral or other circuitry via a digital signal (e.g., as shown in FIGS. 6A and 6B) or an analog signal (e.g., as shown in FIG. 6C). In some embodiments, the smart sensor or the in-pixel or peripheral circuitry can provide the output to a processing unit (e.g., processing unit 910 of FIG. 9, described below), hence a processing unit may receive the output. Means for performing the functionality of block 830 can include, for example, in-pixel circuitry (e.g., Change Detector, Digital Column Line, Analog Column Line, or any combination thereof) and/or peripheral circuitry, as illustrated in FIGS. 3, 4, and 6A-6C.

The method 800 of FIG. 8 can include one or more variations, depending on desired functionality. As previously indicated, the at least one output may comprise a digital output (e.g., FIG. 6A or 6B). Additionally or alternatively, the at least one output may comprise an analog output that provides an output signal only when the value associated with each pixel has changed beyond a threshold level since a previous evaluation period (e.g., FIG. 6C). In some embodiments, a processing unit may receive either or both the digital output or analog output. For at least one pixel of the plurality of pixels, an ADC may be coupled with the analog output of the least one pixel and configured to be disabled, put on stand-by (e.g., a low-power mode), or otherwise consume less power when it is determined, from a digital output signal of the pixel, that the value associated with the pixel has not changed beyond the threshold level since the previous evaluation of the pixel. Alternatively, an ADC can be coupled with the analog output of at least one pixel of the plurality of pixels and additional circuitry coupled with an output of the ADC, where the additional circuitry is configured to ignore an output signal of the ADC when it is determined, from a digital output signal of the at least one pixel, that the value associated with the at least one pixel has not changed beyond the threshold level since the previous evaluation of the at least one pixel. Additionally or alternatively, as shown in FIG. 7, the integration time and/or frame rate may be adjusted as described above, which can provide for power-efficient image capture. In such cases, a pixel exposure value associated with a pixel of the plurality of pixels may be modified based on the integration time.

Figure 9:
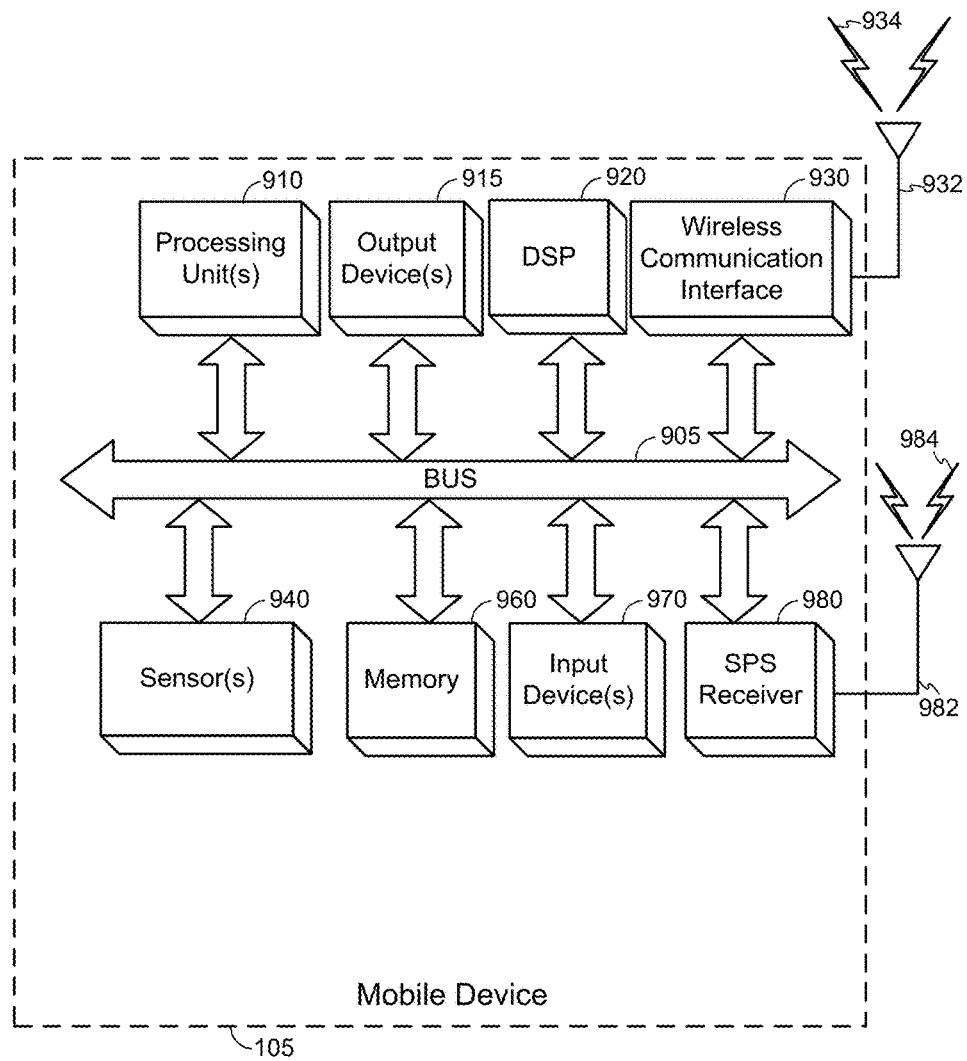
FIG. 9 is a block diagram of an embodiment of a mobile device, which can include a camera and/or other sensor with a pixel array, and utilize the hybrid techniques described herein.

FIG. 9 illustrates an embodiment of a mobile device 105, which can include a camera and/or other sensor with a pixel array, and utilize the hybrid techniques described above. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations. It should also be noted that techniques herein may be implemented in electronic devices other than mobile devices.

The mobile device 105 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as digital signal processing (DSP) chips, graphics acceleration processors, application specific integrated circuits (ASICs), and/or the like), and/or other processing structure or means. The processing unit(s) 910 may correspond to the processing unit of the previously-described embodiments. As shown in FIG. 9, some embodiments may have a separate DSP 920, depending on desired functionality. The mobile device 105 also can include one or more input devices 970, which can include without limitation a touch screen, a touch pad, microphone, button(s), dial(s), switch(es), and/or the like; and one or more output devices 915, which can include without limitation a display, light emitting diode (LED), speakers, and/or the like.

The mobile device 105 might also include a wireless communication interface 930, which can include without limitation a modem, a network card, an infrared communication device, a wireless communication device, and/or a chipset (such as a Bluetooth™ device, an Institute of Electrical and Electronics Engineers standard (IEEE) 802.11 device, an IEEE 802.15.4 device, a WiFi device, a WiMax device, cellular communication facilities, etc.), and/or the like. The wireless communication interface 930 may permit data to be exchanged with a network, wireless access points, other computer systems, and/or any other electronic devices described herein. The communication can be carried out via one or more wireless communication antenna(s) 932 that send and/or receive wireless signals 934.

Depending on desired functionality, the wireless communication interface 930 can include separate transceivers to communicate with base transceiver stations (e.g., base stations of a cellular network) access point(s) (e.g., access point(s) 130 of FIG. 1). Additionally, a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a WPAN may be a Bluetooth network, an IEEE 802.15x, or some other type of network. The techniques described herein may also be used for any combination of wireless wide area network (WWAN), WLAN and/or wireless personal area network (WPAN).

The mobile device 105 can further include sensor(s) 940. Such sensors can include, without limitation, one or more accelerometer(s), gyroscope(s), camera(s), magnetometer(s), altimeter(s), microphone(s), proximity sensor(s), light sensor(s), and the like. The camera(s) may include one or more image arrays, with which the hybrid techniques described herein may be implemented. In other words, sensor(s) 940 can include a sensor where each pixel in an array of pixels is evaluated at a frame rate, yet each pixel includes at least one output indicative of whether the value associated with the pixel has changed relative to a threshold since a previous evaluation of the pixel. The output can be a digital output, an analog output (where a zero volt output indicates no change relative to the threshold). Each pixel may also include two outputs, one digital and one analog. The sensor array can be coupled to an analog-to-digital converter and/or a processor (for example, a dedicated sensor processor), as described elsewhere herein. Outputs of the sensor and/or other sensors may be processed by the processing unit(s) 910 and/or the DSP 920. Thus, in some embodiments, one or both of the digital output or analog output may be provided to the processing unit(s) 910. Alternatively, or additionally, functions described herein as being performed by a processing unit, such as processing unit(s) 910, can be performed by a dedicated microprocessor, controller, or control logic in sensor(s) 940. Such a dedicated microprocessor, controller, or control logic can be included in peripheral circuitry in the sensor(s) 940. For example, such a dedicated microprocessor, controller, or control logic can periodically evaluate each pixel in a plurality of pixels at a frame rate or one or both of the digital output or analog output may be provided to the dedicated microprocessor, or controller.

Embodiments of the mobile device may also include an satellite positioning system (SPS) receiver 980 capable of receiving signals 984 from one or more SPS satellites using an SPS antenna 982. The SPS receiver 980 can extract a position of the mobile device, using global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 980 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 960. The memory 960 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 960 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In particular, although embodiments described above include hardware components, techniques described herein (e.g., the method of FIG. 8 and/or the functionality generally described in relation to FIGS. 3-7) may be performed, in whole or in part, by instructions/code embedded on machine-readable media and executed by one or more processing units. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. An apparatus for providing image sensing, the apparatus comprising:
   a pixel array having a plurality of pixels arranged in two dimensions, wherein:
   input sensed by each pixel of the plurality of pixels results in a value associated with each pixel,
   each pixel of the plurality of pixels is configured to be periodically evaluated at a frame rate, and
   each pixel of the plurality of pixels comprises at least one output, the at least one output comprises an analog output that provides an output signal to peripheral circuitry only when the value associated with each pixel has changed above a threshold level since the previous evaluation of the pixel.

2. The apparatus of claim 1, wherein the at least one output further comprises a digital output indicative of whether the value associated with the pixel has changed beyond the threshold level since the previous evaluation of the pixel.

3. The apparatus of claim 1, further comprising, for at least one pixel of the plurality of pixels, an analog-to-digital converter (ADC) coupled with the analog output of the least one pixel and configured to be in a low-power mode when it is determined, from a digital output signal of the pixel, that the value associated with the pixel has not changed beyond the threshold level since the previous evaluation of the pixel.

4. The apparatus of claim 1, further comprising:
an analog-to-digital converter (ADC) coupled with the analog output of at least one pixel of the plurality of pixels; and
additional circuitry coupled with an output of the ADC, wherein the additional circuitry is configured to ignore an output signal of the ADC when it is determined, from a digital output signal of the at least one pixel, that the value associated with the at least one pixel has not changed beyond the threshold level since the previous evaluation of the at least one pixel.

5. The apparatus of claim 1, further comprising a processing unit configured to adjust an integration time.

6. The apparatus of claim 5, wherein the processing unit is further configured to modify a pixel exposure value associated with a pixel of the plurality of pixels based on the integration time.

7. The apparatus of claim 1, further comprising a processing unit configured to adjust the frame rate.

8. A method for providing image sensing, the method comprising:
for each pixel in a plurality of pixels in a pixel array, sensing a value associated with the pixel;
periodically evaluating each pixel in the plurality of pixels at a frame rate; and providing, at each pixel of the plurality of pixels, at least one output, the at least one output comprising an analog output that provides an output signal to peripheral circuitry only when the value associated with the pixel has changed beyond above a threshold level since a previous evaluation of the pixel.

9. The method of claim 8, wherein the at least one output further comprises a digital output indicative of whether the value associated with the pixel has changed beyond the threshold level since the previous evaluation of the pixel.

10. The method of claim 8, further comprising operating an analog-to-digital converter (ADC) coupled with the analog output of the least one pixel of the plurality of pixels in a low-power mode when it is determined, from a digital output signal of the pixel, that the value associated with the pixel has not changed beyond the threshold level since the previous evaluation of the pixel.

11. The method of claim 8, further comprising ignoring an output signal of an analog-to-digital converter (ADC) coupled with the analog output of at least one pixel of the plurality of pixels when it is determined, from a digital output signal of the at least one pixel, that the value associated with the at least one pixel has not changed beyond the threshold level since the previous evaluation of the at least one pixel.

12. The method of claim 8, further comprising adjusting an integration time of at least one pixel of the plurality of pixels.

13. The method of claim 12, further comprising modifying a pixel exposure value associated with the at least one pixel based on the integration time.

14. The method of claim 8, further comprising adjusting the frame rate.

15. An apparatus comprising:
means for sensing, for each pixel in a plurality of pixels in a pixel array, a value associated with the pixel;
means for periodically evaluating each pixel in the plurality of pixels at a frame rate; and
means for providing, at each pixel of the plurality of pixels, at least one output, the means for providing at least one output comprising means for providing an analog output signal to peripheral circuitry only when the value associated with each pixel has changed above a threshold level since a previous evaluation of the pixel.

16. The apparatus of claim 15, wherein the means for providing at least one output further comprise means for providing a digital output indicative of whether the value associated with the pixel has changed beyond the threshold level since the previous evaluation of the pixel.

17. The apparatus of claim 15, further comprising: means for causing an analog-to-digital converter (ADC) coupled with the means for providing an analog output signal of the least one pixel of the plurality of pixels to operate in a low-power mode when it is determined, from a digital output signal of the pixel, that the value associated with the pixel has not changed beyond the threshold level since the previous evaluation of the pixel.

18. The apparatus of claim 15, further comprising means for ignoring an output signal of an analog-to-digital converter (ADC) coupled with the analog output of at least one pixel of the plurality of pixels when it is determined, from a digital output signal of the at least one pixel, that the value associated with the at least one pixel has not changed beyond the threshold level since the previous evaluation of the at least one pixel.

19. The apparatus of claim 15, further comprising means for adjusting an integration time of at least one pixel of the plurality of pixels.

20. The apparatus of claim 19, further comprising means for modifying a pixel exposure value associated with the at least one pixel based on the integration time.

21. The apparatus of claim 15, means for adjusting the frame rate.

22. A non-transitory computer-readable medium having instructions embedded thereon for processing an image, the instructions, when executed by one or more processing units, cause the one or more processing units to:
periodically evaluate each pixel in a plurality of pixels at a frame rate, wherein input sensed by each pixel of the plurality of pixels results in a value associated with each pixel; and
receive, for each pixel of the plurality of pixels, at least one output, the at least one output comprising an analog output that provides an output signal to peripheral circuitry only when the value associated with the pixel has changed above a threshold level since a previous evaluation of the pixel.

23. The non-transitory computer-readable medium of claim 22, wherein the instructions for causing the one or more processing units to receive the at least one output include instructions for receiving a digital output indicative of whether the value associated with the pixel has changed beyond the threshold level since the previous evaluation of the pixel.

24. The non-transitory computer-readable medium of claim 22, further comprising instructions for causing the one or more processing units to operate an analog-to-digital converter (ADC) coupled with the analog output of the least one pixel of the plurality of pixels in a low-power mode when it is determined, from a digital output signal of the pixel, that the value associated with the pixel has not changed beyond the threshold level since the previous evaluation of the pixel.

25. The non-transitory computer-readable medium of claim 22, further comprising instructions for causing the one or more processing units to ignore an output signal of an analog-to-digital converter (ADC) coupled with the analog output of at least one pixel of the plurality of pixels when it is determined, from a digital output signal of the at least one pixel, that the value associated with the at least one pixel has not changed beyond the threshold level since the previous evaluation of the at least one pixel.

26. The non-transitory computer-readable medium of claim 22, further comprising instructions for causing the one or more processing units to adjust an integration time of at least one pixel of the plurality of pixels.

27. The non-transitory computer-readable medium of claim 26, further comprising instructions for causing the one or more processing units to modify a pixel exposure value associated with the at least one pixel based on the integration time.

28. The non-transitory computer-readable medium of claim 22, further comprising instructions for causing the one or more processing units to adjust the frame rate.

* * * * *

UNITED STATES PATENT AND TRADEMARK OFFICE
CERTIFICATE OF CORRECTION

PATENT NO. : 9,986,179 B2
APPLICATION NO. : 14/864700
DATED : May 29, 2018
INVENTOR(S) : Alok Govil Page 1 of 1

It is certified that error appears in the above-identified patent and that said Letters Patent is hereby corrected as shown below:

In the Claims

Column 17, Claim 8, Line 38-39:
Replace "the pixel has changed beyond above a threshold level," with --the pixel has changed above a threshold level--

Signed and Sealed this
Seventh Day of August, 2018

Andrei Iancu
*Director of the United States Patent and Trademark Office*